(12) United States Patent
Yoon

(10) Patent No.: US 12,422,371 B2
(45) Date of Patent: Sep. 23, 2025

(54) METHOD OF TESTING DISPLAY DEVICE

(71) Applicant: Samsung Display Co., Ltd., Yongin-si (KR)

(72) Inventor: Jehyeon Yoon, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 559 days.

(21) Appl. No.: 17/965,188

(22) Filed: Oct. 13, 2022

(65) Prior Publication Data
US 2023/0132264 A1    Apr. 27, 2023

(30) Foreign Application Priority Data

Oct. 22, 2021   (KR) .......... 10-2021-0141852

(51) Int. Cl.
*G01N 21/95* (2006.01)
*G01N 21/88* (2006.01)

(52) U.S. Cl.
CPC ......... *G01N 21/8851* (2013.01); *G01N 21/95* (2013.01); *G01N 2021/8887* (2013.01); *G01N 2201/121* (2013.01)

(58) Field of Classification Search
CPC ............... G01N 21/8851; G01N 21/95; G01N 2021/8887; G01N 2201/121; G01N 21/95607; G01N 2021/9513; G01N 2021/8854; G01N 2201/0662; G01N 2201/104; G06T 7/0004
See application file for complete search history.

(56) References Cited

U.S. PATENT DOCUMENTS

2006/0067571 A1 * 3/2006 Onishi ................... G06T 7/001
382/149

FOREIGN PATENT DOCUMENTS

| CN | 105205803 A | * 12/2015 | .......... G06T 7/0008 |
| JP | 2004219291 A | * 8/2004 | |
| JP | 2009122046 A | * 6/2009 | |
| KR | 102172246 B1 | 10/2020 | |
| TW | I693629 B | * 5/2020 | ............. G06T 7/001 |

* cited by examiner

*Primary Examiner* — Vu Le
*Assistant Examiner* — Jacob Tyler Collogan
(74) *Attorney, Agent, or Firm* — CANTOR COLBURN LLP

(57) ABSTRACT

A method of testing a display device includes obtaining a photographed image by photographing a target substrate, where the target substrate includes patterns arranged in a first direction and a second direction, obtaining grayscale values of the patterns by grayscaling the photographed image, determining an inspection target pattern from among the patterns, obtaining a first comparison value by comparing a grayscale value of the inspection target pattern with a grayscale value of a first vertically adjacent pattern adjacent in the first direction, obtaining a second comparison value by comparing the grayscale value of the inspection target pattern with a grayscale value of a first diagonally adjacent pattern adjacent in a third direction crossing the first and second directions, obtaining a compensated comparison value by compensating the first comparison value based on the second comparison value, and determining a defect of the inspection target pattern based on the compensated comparison value.

20 Claims, 14 Drawing Sheets

| 3 | 72 | 3 | 3 | 75 | 3 |
|---|---|---|---|---|---|
| 4 | 84 | 4 | 4 | 84 | 3 |
| 3 | 83 | 3 | 3 | 93 | 3 |
| 92 | 3 | 74 | 79 | 3 | 91 |
| 79 | 4 | 81 | 84 | 4 | 72 |
| 91 | 5 | 83 | 93 | 3 | 91 |

GV_PN8

| 7 | 72 | 243 | 8 | 75 | 8 |
|---|---|---|---|---|---|
| 5 | 84 | 193 | 4 | 84 | 5 |
| 2 | 183 | 3 | 3 | 163 | 3 |
| 152 | 3 | 74 | 243 | 3 | 91 |
| 79 | 7 | 81 | 84 | 4 | 72 |
| 91 | 5 | 83 | 93 | 3 | 91 |

| 4 | 0 | 240 | 5 | 0 | 5 |
|---|---|---|---|---|---|
| 1 | 0 | 189 | 0 | 0 | 1 |
| 1 | 100 | 0 | 0 | 70 | 0 |
| 60 | 0 | 0 | 164 | 0 | 0 |
| 0 | 3 | 0 | 0 | 0 | 0 |
| 0 | 0 | 0 | 0 | 0 | 0 |

CV1

|  |  | 240 |  |  |  |
|---|---|---|---|---|---|
|  |  | 189 |  |  |  |
|  | 100 |  |  | 70 |  |
| 60 |  |  | 164 |  |  |
|  |  |  |  |  |  |
|  |  |  |  |  |  |

| 3 | 72 | 3 | 3 | 75 | 3 |
|---|---|---|---|---|---|
| 4 | 84 | 4 | 4 | 84 | 4 |
| 3 | 83 | 3 | 3 | 93 | 3 |
| 92 | 3 | 74 | 79 | 3 | 91 |
| 79 | 4 | 81 | 84 | 4 | 72 |
| 91 | 5 | 83 | 93 | 3 | 91 |

GV_PN9

| 47 | 72 | 233 | 55 | 75 | 7 |
|---|---|---|---|---|---|
| 8 | 84 | 183 | 4 | 84 | 5 |
| 10 | 93 | 3 | 3 | 103 | 54 |
| 90 | 3 | 74 | 77 | 3 | 81 |
| 88 | 7 | 81 | 84 | 4 | 72 |
| 91 | 5 | 83 | 93 | 3 | 91 |

| 44 | 0 | 230 | 55 | 0 | 4 |
|---|---|---|---|---|---|
| 4 | 0 | 179 | 0 | 0 | 1 |
| 7 | 10 | 0 | 0 | 10 | 51 |
| 2 | 0 | 0 | 2 | 0 | 10 |
| 9 | 3 | 0 | 0 | 0 | 0 |
| 0 | 0 | 0 | 0 | 0 | 0 |

CV2

| 44 |  | 230 | 52 |  |  |
|---|---|---|---|---|---|
|  |  | 179 |  |  |  |
|  |  |  |  |  | 51 |
|  |  |  |  |  |  |
|  |  |  |  |  |  |
|  |  |  |  |  |  |

|   |   | 240 |   |   |
|---|---|-----|---|---|
|   |   | 189 |   |   |
|   | 100 |   |   | 70 |
| 60 |   |   | 164 |   |
|   |   |   |   |   |
|   |   |   |   |   |

CV2

| 44 |   | 230 | 52 |   |   |
|----|---|-----|----|---|---|
|    |   | 179 |    |   |   |
|    |   |     |    |   | 51 |
|    |   |     |    |   |   |
|    |   |     |    |   |   |
|    |   |     |    |   |   |

FIG. 11

CDV

| 44 |   | 10 | 52 |   |   |
|----|---|----|----|---|---|
|    |   | 10 |    |   |   |
|    | 100 |  |    | 70 | 51 |
| 60 |   |   | 164 |   |   |
|    |   |   |    |   |   |
|    |   |   |    |   |   |

CCV

|   |   | 240 |   |   |   |
|---|---|-----|---|---|---|
|   |   | 189 |   |   |   |
|   |   |     |   |   |   |
|   |   |     |   |   |   |
|   |   |     |   |   |   |
|   |   |     |   |   |   |

| 4 | 0 | 240 | 5 | 0 | 5 |
|---|---|---|---|---|---|
| 1 | 0 | 189 | 0 | 0 | 1 |
| 1 | 100 | 0 | 0 | 70 | 0 |
| 60 | 0 | 0 | 164 | 0 | 0 |
| 0 | 3 | 0 | 0 | 0 | 0 |
| 0 | 0 | 0 | 0 | 0 | 0 |

V_DV2

| 8 | 0 | 244 | 1 | 0 | 7 |
|---|---|---|---|---|---|
| 1 | 0 | 181 | 0 | 0 | 3 |
| 3 | 98 | 0 | 0 | 72 | 0 |
| 64 | 0 | 0 | 162 | 0 | 0 |
| 0 | 3 | 0 | 0 | 0 | 0 |
| 0 | 0 | 0 | 0 | 0 | 0 |

FIG. 15

ITV

| 6 | 0 | 242 | 1 | 0 | 6 |
|---|---|---|---|---|---|
| 1 | 0 | 185 | 0 | 0 | 2 |
| 2 | 99 | 0 | 0 | 71 | 0 |
| 62 | 0 | 0 | 163 | 0 | 0 |
| 0 | 3 | 0 | 0 | 0 | 0 |
| 0 | 0 | 0 | 0 | 0 | 0 |

CV1'

|   |   | 242 |   |   |   |
|---|---|---|---|---|---|
|   |   | 185 |   |   |   |
|   |   | 185 |   | 71 |   |
| 62 |   |   | 163 |   |   |
|   |   |   |   |   |   |
|   |   |   |   |   |   |

* RV1 = 15

METHOD OF TESTING DISPLAY DEVICE

This application claims priority to Korean Patent Application No. 10-2021-0141852, filed on Oct. 22, 2021, and all the benefits accruing therefrom under 35 U.S.C. § 119, the content of which in its entirety is herein incorporated by reference.

BACKGROUND

1. Field

Embodiments relate to a method of testing a display device using a grayscale difference.

2. Description of the Related Art

A display device is a device that displays an image. The display device may include a display panel including a plurality of pixels and a driving part.

In a manufacturing process of a display device, a plurality of display panels may be simultaneously manufactured. For example, a plurality of display panels may be manufactured on one mother substrate. In this case, a defect may occur in one of the plurality of display panels. If the defect is not detected early, a display performance of a display device including a display panel may be deteriorated.

SUMMARY

Embodiments provide a method of testing a display device to detect a defect in the display device.

An embodiment of a method of testing a display device includes obtaining a photographed image by photographing a target substrate, where the target substrate includes a plurality of patterns arranged in a first direction and a second direction perpendicular to the first direction, obtaining grayscale values of the plurality of patterns by grayscaling the photographed image, determining an inspection target pattern from among the plurality of patterns, obtaining a first comparison value by comparing a grayscale value of the inspection target pattern with a grayscale value of a first vertically adjacent pattern adjacent to the inspection target pattern in the first direction, obtaining a second comparison value by comparing the grayscale value of the inspection target pattern with a grayscale value of a first diagonally adjacent pattern adjacent to the inspection target pattern in a third direction crossing the first direction and the second direction, obtaining a compensated comparison value by compensating the first comparison value based on the second comparison value, and determining a defect of the inspection target pattern based on the compensated comparison value.

In an embodiment, the obtaining the first comparison value may include obtaining a first vertical difference value by obtaining a difference between the grayscale value of the inspection target pattern and the grayscale value of the first vertically adjacent pattern, and determining the first vertical difference value as the first comparison value when the first vertical difference value is greater than a first reference value.

In an embodiment, the obtaining the second comparison value may include obtaining a first diagonal difference value by obtaining a difference between the grayscale value of the inspection target pattern and the grayscale value of the first diagonally adjacent pattern, and determining the first diagonal difference value as the second comparison value when the first diagonal difference value is greater than a second reference value.

In an embodiment, the first reference value and the second reference value may be different from each other.

In an embodiment, the first reference value may be greater than the second reference value.

In an embodiment, an angle between the first direction and the third direction may be greater than 0° and smaller than 90°.

In an embodiment, the obtaining the compensated comparison value may include obtaining a comparison difference value by obtaining a difference between the first comparison value and the second comparison value, and determining the first comparison value as the compensated comparison value when the comparison difference value is equal to or less than a third reference value.

In an embodiment, the obtaining the first comparison value may further include comparing the grayscale value of the inspection target pattern with a grayscale value of a second vertically adjacent pattern adjacent to the inspection target pattern in a direction opposite to the first direction.

In an embodiment, the obtaining the first comparison value may further include obtaining a first vertical difference value by obtaining a difference between the grayscale value of the inspection target pattern and the grayscale value of the first vertically adjacent pattern, obtaining a second vertical difference value by obtaining a difference between the grayscale value of the inspection target pattern and the grayscale value of the second vertically adjacent pattern, obtaining an interpolated value by interpolating the first vertical difference value and the second vertical difference value, and determining the interpolated value as the first comparison value when the interpolated value is greater than a first reference value.

In an embodiment, the interpolated value may be an average of the first vertical difference value and the second vertical difference value.

In an embodiment, the obtaining the second comparison value may further include comparing the grayscale value of the inspection target pattern with a grayscale value of a second diagonally adjacent pattern adjacent to the inspection target pattern in a direction opposite to the third direction.

In an embodiment, the obtaining the second comparison value may further include comparing the grayscale value of the inspection target pattern with a grayscale value of a third diagonally adjacent pattern adjacent to the inspection target pattern in a fourth direction crossing the first direction and the second direction.

In an embodiment, the obtaining the second comparison value may further include comparing the grayscale value of the inspection target pattern with a grayscale value of a fourth diagonally adjacent pattern adjacent to the inspection target pattern in a direction opposite to the fourth direction.

An embodiment of a method of testing a display device includes obtaining a photographed image by photographing a target substrate, where the target substrate includes a plurality of patterns arranged in a first direction and a second direction perpendicular to the first direction, obtaining grayscale values of the plurality of patterns by grayscaling the photographed image, determining an inspection target pattern from among the plurality of patterns, obtaining a first comparison value by comparing a grayscale value of the inspection target pattern with a grayscale value of a first vertically adjacent pattern adjacent to the inspection target pattern in the first direction and a grayscale value of a first horizontally adjacent pattern adjacent to the inspection target pattern in the second direction, obtaining a second comparison value by comparing the grayscale value of the inspection target pattern with a grayscale value of a first diagonally adjacent pattern adjacent to the inspection target pattern in a third direction crossing the first direction and the second direction, obtaining a compensated comparison value by compensating the first comparison value based on the second comparison value, and determining a defect of the inspection target pattern based on the compensated comparison value.

In an embodiment, the obtaining the first comparison value may include obtaining a first vertical difference value by obtaining a difference between the grayscale value of the inspection target pattern and the grayscale value of the first vertically adjacent pattern, obtaining a first horizontal difference value by obtaining a difference between the grayscale value of the inspection target pattern and the grayscale value of the first horizontally adjacent pattern, obtaining an interpolated value by interpolating the first vertical difference value and the first horizontal difference value, and determining the interpolated value as the first comparison value when interpolated value is greater than a first reference value.

In an embodiment, the interpolated value may be an average of the first vertical difference value and the first horizontal difference value.

In an embodiment, the obtaining the second comparison value may include obtaining a first diagonal difference value by obtaining a difference between the grayscale value of the inspection target pattern and the grayscale value of the first diagonally adjacent pattern, and determining the first diagonal difference value as the second comparison value when the first diagonal difference value is greater than a second reference value.

In an embodiment, the first reference value and the second reference value may be different from each other.

In an embodiment, an angle between the first direction and the third direction may be greater than 0° and smaller than 90°.

In an embodiment, the obtaining the compensated comparison value may include obtaining a comparison difference value by obtaining a difference between the first comparison value and the second comparison value, and determining the first comparison value as the compensated comparison value when the comparison difference value is equal to or less than a third reference value.

In embodiments, a method of testing a display device may include obtaining a first comparison value by comparing a gradation value of an inspection target pattern and a gradation value of a first vertically adjacent pattern, obtaining a second comparison value by comparing the gradation value of an inspection target pattern and a gradation value of a first diagonally adjacent pattern, and obtaining a compensated comparison value by compensating the first comparison value based on the second comparison value. Accordingly, defect detection accuracy may be improved.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the embodiments.

FIG. 3 to FIG. 16 are diagrams illustrating a method of testing a display device according to an embodiment.

DETAILED DESCRIPTION

Figure 1:
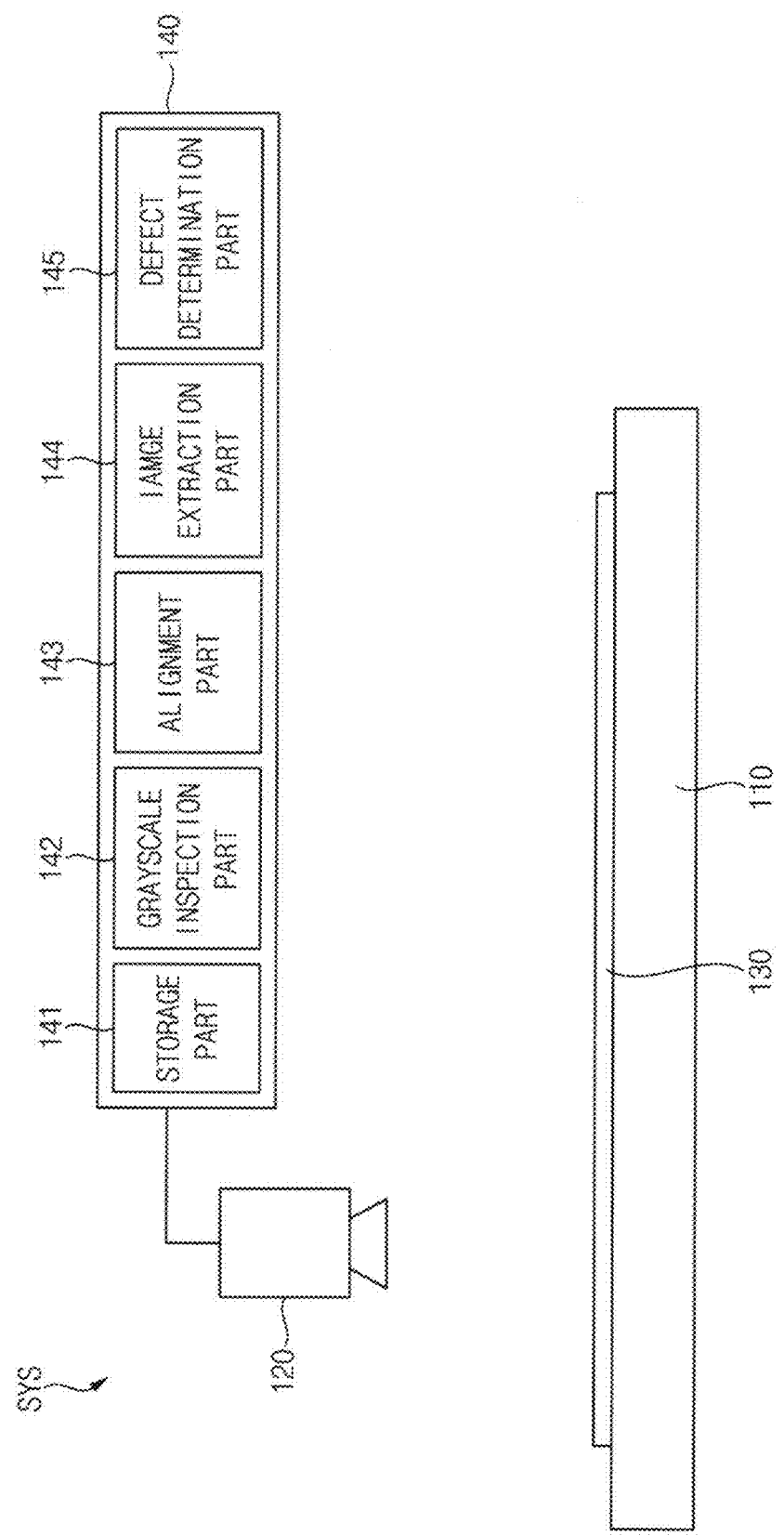
FIG. 1 is a diagram illustrating a display device inspection system according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like reference numerals refer to like elements throughout.

As used herein, a reference number may indicate a singular element or a plurality of the element. For example, a reference number labeling a singular form of an element within the drawing figures may be used to reference a plurality of the singular element within the text of specification.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with the accompanying drawings.

FIG. 1 is a diagram illustrating a display device inspection system according to an embodiment.

Referring to FIG. 1, an embodiment of a display device inspection system SYS may include a stage 110, on which a target substrate 130 is disposed, a camera 120, and a processing part (or a processor) 140. The processing part 140 may include a storage part 141, a grayscale inspection part 142, an alignment part 143, an image extraction part 144, and a defect determination part 145.

The target substrate 130 may be disposed on the stage 110.

The camera 120 may photograph the target substrate 130 disposed on the stage 110. Accordingly, the camera 120 may acquire an photographed image of the target substrate 130.

The storage part 141 may store the photographed image obtained by the camera 120.

The grayscale inspection part 142 may obtain grayscale value of the photographed image. In an embodiment, for example, the grayscale inspection part 142 may generate grayscale value by converting the photographed image acquired by the camera 120 into grayscale values. In an embodiment, the grayscale inspection part 142 may generate the grayscale value having a value of 0 to 255 by detecting a grayscale of the photographed image.

The alignment part 143 may align the photographed image. In an embodiment, the photographed image may be acquired by photographing the target substrate 130 with the camera 120 while changing position of the camera 120 with respect to the target substrate 130. In such an embodiment, the photographed image may have an alignment error. The alignment part 143 may correct the alignment error of the photographed image.

The image extraction part 144 may extract an inspection target image and at least one comparison image corresponding to or matching the inspection target image from the photographed image.

The defect determination part 145 may determine whether a defect occurs in the photographed image. In an embodiment, for example, the defect determination part 145 may compare the inspection target image with the comparison image to determine whether a defect occurs in an area where the inspection target image is captured.

Figure 2:
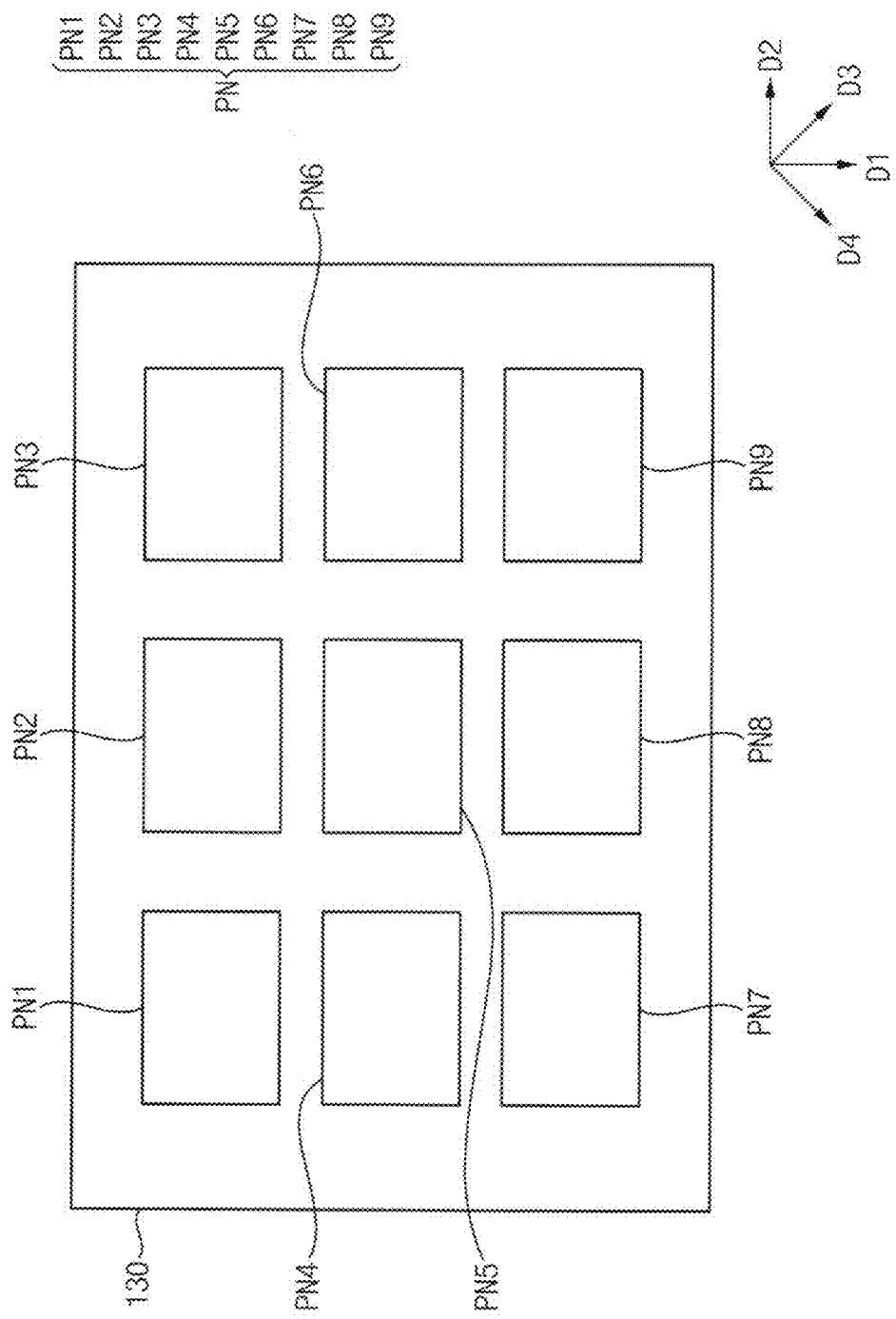
FIG. 2 is a plan view illustrating an embodiment of a target substrate of FIG. 1.

FIG. 2 is a plan view illustrating an embodiment of the target substrate of FIG. 1.

Referring to FIG. 2, an embodiment of the target substrate 130 may be a mother substrate including a plurality of patterns PN. In an embodiment, each of the plurality of patterns PN may be one display panel. But, the invention is not limited thereto. In an alternative embodiment, for example, the target substrate 130 may be various types of substrate on which repeating patterns (e.g., devices or wirings) are disposed or formed.

FIG. 2 shows an embodiment in which the plurality of patterns PN includes first to ninth patterns PN1, PN2, PN3, PN4, PN5, PN6, PN7, PN8, and PN9 for convenience of description. The first to ninth patterns PN1, PN2, PN3, PN4, PN5, PN6, PN7, PN8, and PN9 may be arranged in a first direction D1 and a second direction D2 perpendicular to the first direction D1.

FIG. 3 to FIG. 16 are diagrams illustrating a method of testing a display device according to an embodiment.

Figure 3:
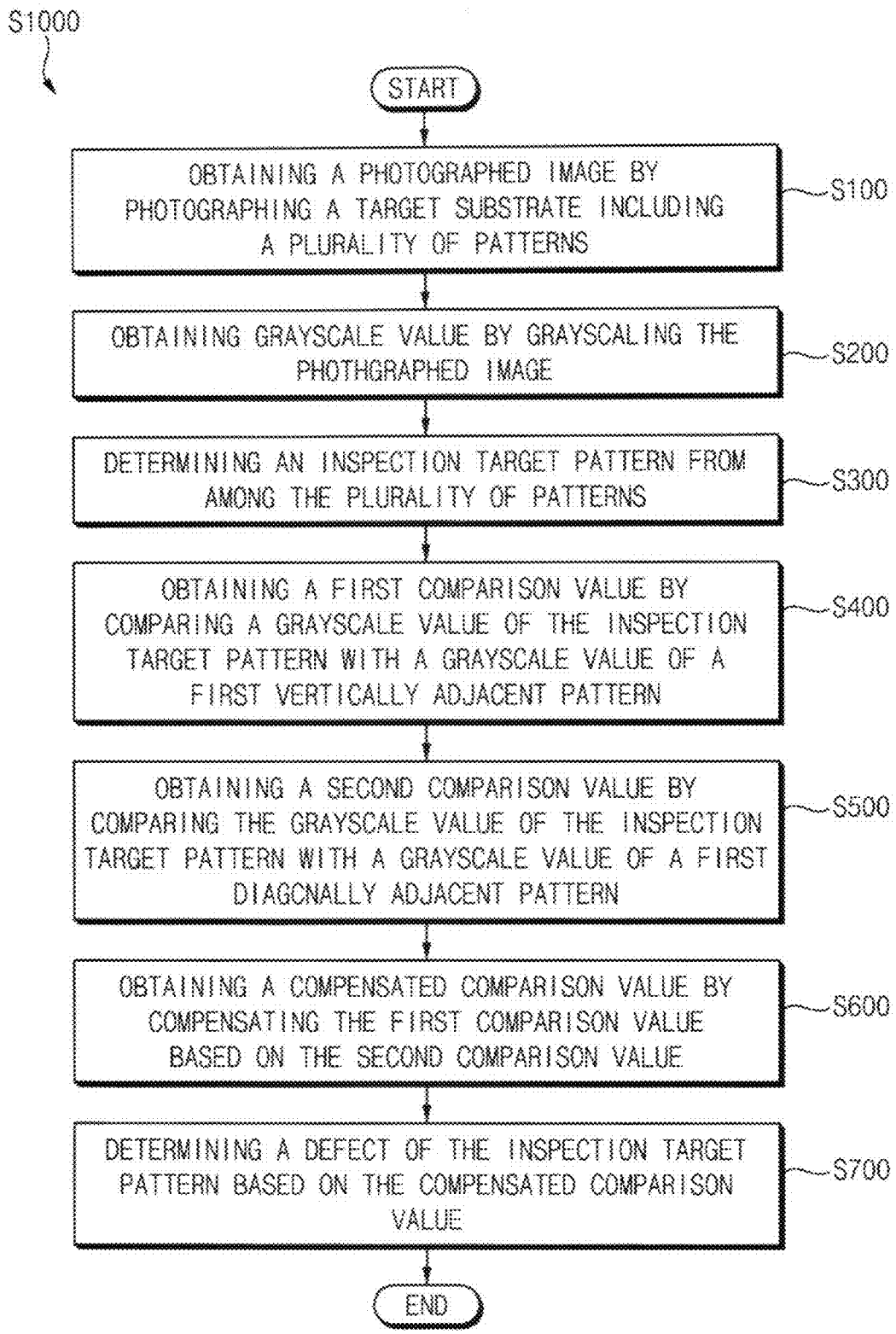

FIG. 3 is a flowchart illustrating a method of testing a display device according to an embodiment.

Referring to FIG. 3, an embodiment of a method S1000 of testing a display device may include obtaining a photographed image by photographing the target substrate 130 including the plurality of patterns PN (S100), obtaining grayscale values of the plurality of patterns PN by grayscaling the photographed image (S200), determining an inspection target pattern from among the plurality of patterns PN (S300), obtaining a first comparison value by comparing a grayscale value of the inspection target pattern with a grayscale value of a first vertically adjacent pattern (S400), obtaining a second comparison value by comparing the grayscale value of the inspection target pattern with a grayscale value of a first diagonally adjacent pattern (S500), obtaining a compensated comparison value by compensating the first comparison value based on the second comparison value (S600), and determining a defect of the inspection target pattern based on the compensated comparison value (S700).

The obtaining the photographed image (S100) may include photographing the target substrate 130 with the camera 120 and storing the photographed image.

The obtaining the grayscale value (S200) may include generating the grayscale value by identifying a grayscale of the photographed image. In an embodiment, the grayscale value may have a value of 0 to 255.

In determining the inspection target pattern (S300), any one of the first to ninth patterns PN1, PN2, PN3, PN4, PN5, PN6, PN7, PN8, and PN9 may be set as the inspection target pattern. Hereinafter, for convenience of description, an embodiment in which the fifth pattern PN5 is the inspection target pattern will be described.

The eight pattern PN8 adjacent to the inspection target pattern PN5 in the first direction D1 may be referred to as the first vertically adjacent pattern. The ninth pattern PN9 adjacent to the inspection target pattern PN5 in a third direction D3 crossing the first direction D1 and the second direction D2 may be referred to as the first diagonally adjacent pattern. In such an embodiment, an angle formed by the first direction D1 and the second direction D3 may be greater than 0° and less than 90°. In an embodiment, for example, the angle formed by the first direction D1 and the third direction D3 may be greater than about 35° and smaller than about 55°.

FIG. 4, FIG. 5, FIG. 6, FIG. 7, and FIG. 8 are diagrams illustrating the obtaining the first comparison value (S400) and the obtaining the second comparison value (S500) of FIG. 3.

Figure 4:
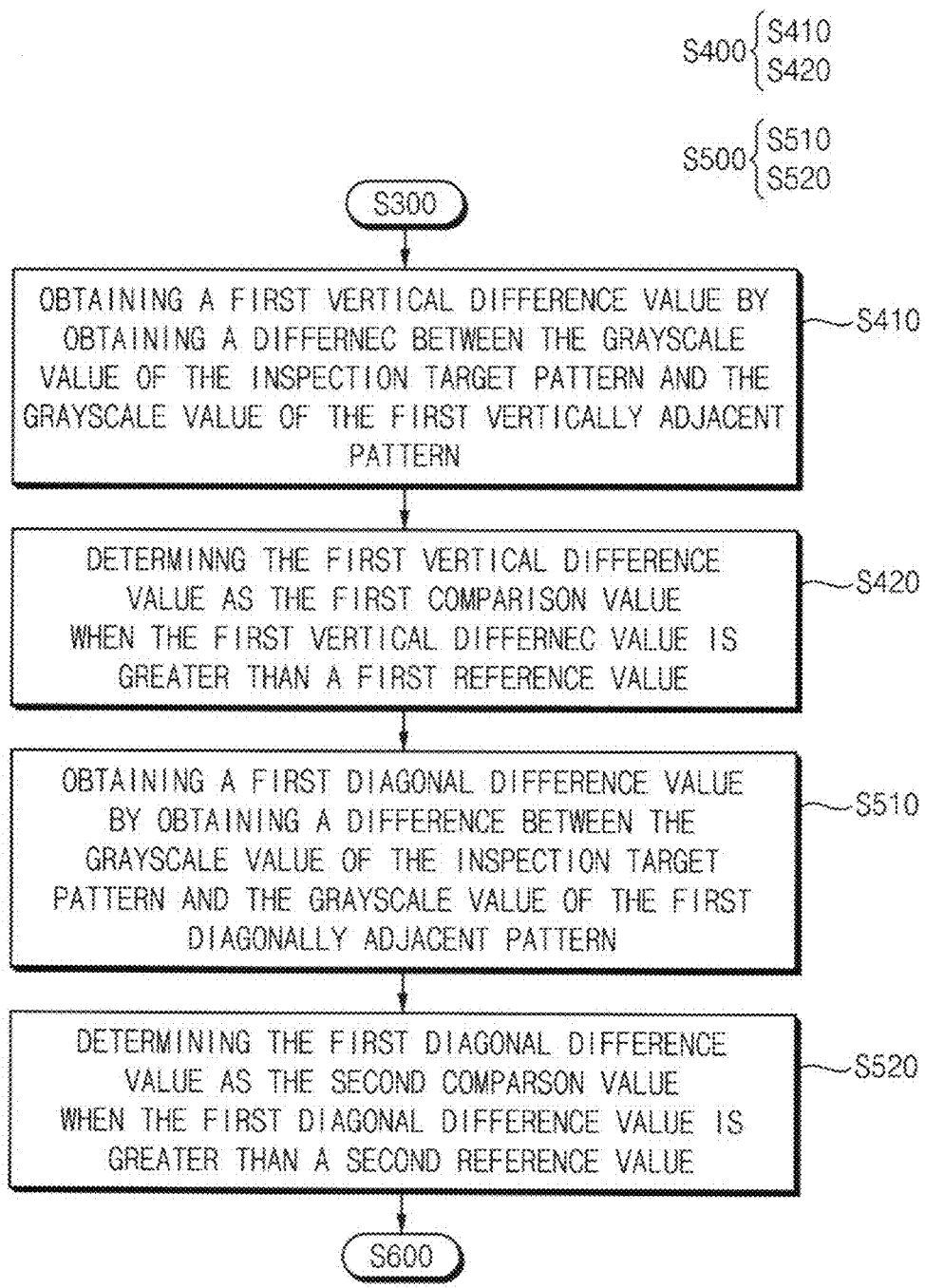

Referring to FIG. 4, FIG. 5, and FIG. 6, the obtaining the first comparison value CV1 (S400) may include obtaining a first vertical difference value DV1 by obtaining a difference between the grayscale value GV_PN5 of the inspection target pattern PN5 and a grayscale value GV_PN8 of the first vertically adjacent pattern PN8 (S410) and determining the first vertical difference value DV1 as the first comparison value CV1 when the first vertical difference value DV1 is greater than a first reference value RV1 (S420).

The first vertical difference value DV1 may be an absolute value of a value obtained by subtracting the grayscale value GV_PN5 of the inspection target pattern PN5 from the grayscale value GV_PN8 of the first vertically adjacent pattern PN8. In an embodiment, for example, as shown in FIG. 5, each of the grayscale value GV_PN5 of the inspection target pattern PN5 and the grayscale value GV_PN8 of the first vertically adjacent pattern PN8 may include grayscale values of 0 to 255. In such an embodiment, as shown in FIG. 6, the absolute value of the difference between the grayscale value GV_PN5 of the inspection target pattern PN5 and the grayscale value GV_PN8 of the first vertically adjacent pattern PN8 may be the first vertical difference value DV1 including values of 0 to 255.

The first comparison value CV1 may be a value obtained by extracting a value greater than the first reference value RV1 from the first vertical difference value DV1. The first reference value RV1 may be an arbitrarily set value. In an embodiment, for example, as shown in FIG. 6, the first reference value RV1 may be set to 15. In such an embodiment, a value greater than 15 among the values included in the first vertical difference value DV1 may be extracted and defined as the first comparison value CV1.

Referring to FIG. 4, FIG. 7, and FIG. 8, the obtaining the second comparison value CV2 (S500) may include obtaining a first diagonal difference value DV2 by obtaining a difference between the grayscale value GV_PN5 of the inspection target pattern PN5 and the grayscale value GV_PN9 of the first diagonally adjacent pattern PN9 (S510) and determining the first diagonal difference value DV2 as the second comparison value CV2 when the first diagonal difference value DV2 is greater than a second reference value RV2 (S520).

The first diagonal difference value DV2 may be an absolute value of a value obtained by subtracting the grayscale value GV_PN5 of the inspection target pattern PN5 from the grayscale value GV_PN9 of the first diagonally adjacent pattern PN9. In an embodiment, for example, as shown in FIG. 7, each of the grayscale value GV_PN5 of the inspection target pattern PN5 and the grayscale value GV_PN9 of the first diagonally adjacent pattern PN9 may include grayscale values of 0 to 255. In such an embodiment, as shown in FIG. 8, the absolute value of the difference between the grayscale value GV_PN5 of the inspection target pattern PN5 and the grayscale value GV_PN9 of the first diagonally adjacent pattern PN9 may be the first diagonal difference value DV2.

The second comparison value CV2 may be a value obtained by extracting a value greater than the second reference value RV2 from the first diagonal difference value DV2. The second reference value RV2 may be an arbitrarily set value. In an embodiment, for example, as shown in FIG. 8, the second reference value RV2 may be set to 10. In such an embodiment, a value greater than 10 among the values included in the first diagonal difference value DV2 may be extracted and defined as the second comparison value CV2.

In an embodiment, the first reference value RV1 and the second reference value RV2 may be different from each other. In an embodiment, for example, the first reference value RV1 may be greater than the second reference value RV2.

Figure 9:
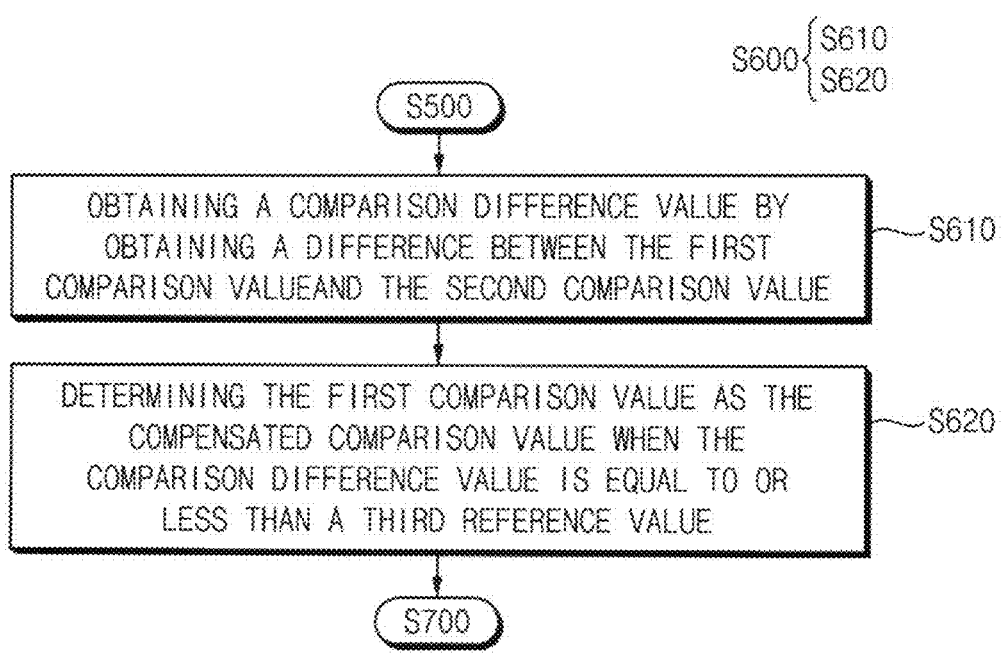

FIG. 9, FIG. 10, and FIG. 11 are diagrams illustrating the obtaining the compensated comparison value (S600) of FIG. 3.

Referring to FIG. 9, FIG. 10, and FIG. 11, the obtaining the compensated comparison value CCV (S600) may include obtaining a comparison difference value CDV by obtaining a difference between the first comparison value CV1 and the second comparison value CV2 (S610) and determining the first comparison value CV1 as the compensated comparison value CCV when the comparison difference value CDV is equal to or less than a third reference value RV3 (S620).

The comparison difference value CDV may be an absolute value of a value obtained by subtracting the first comparison value CV1 from second comparison value CV2. In an embodiment where the second comparison value CV2 corresponding to the first comparison value CV1 is not defined, the second comparison value CV2 corresponding to the first comparison value CV1 may be set to zero. In an embodiment where the first comparison value CV1 corresponding to the second comparison value CV2 is not defined, the first comparison value CV1 corresponding to the second comparison value CV2 may be set to zero.

Values having a value equal to or less than the third reference value RV3 may be extracted from the comparison difference value CDV. The first comparison value CV1 corresponding to the values having a value equal to or less than the third reference value RV3 in the comparison difference value CDV may be set as the compensated comparison value CCV. The third reference value RV3 may be an arbitrarily set value. In an embodiment, for example, when the third reference value RV3 is set to 20, after values having a value of 20 or less are extracted from the comparison difference value CDV, the first comparison value CV1 corresponding thereto may be set as the compensated comparison value CCV.

Figure 12:
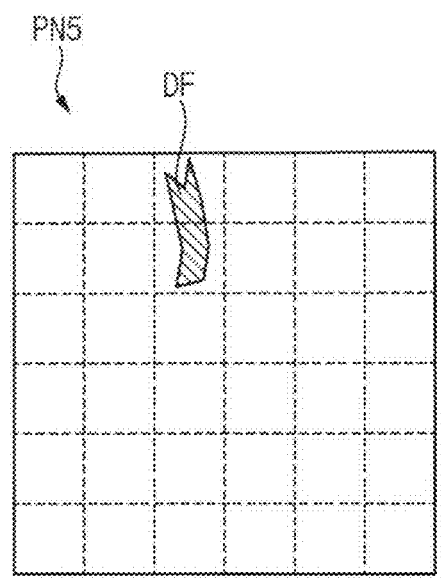

FIG. 12 is a diagram illustrating determining a defect of the inspection target pattern (S700) of FIG. 3.

Referring to FIG. 12, the defect DF of the inspection target pattern PN5 may be detected from the compensated comparison value CCV.

The inspection target pattern PN5 may include the defect DF such as being pressed or dented. The defect DF may be detected by a grayscale difference between the inspection target pattern PN5 and patterns (e.g., PN8 or PN9) adjacent to the inspection target pattern PN5. In an embodiment of the method of testing the display device, the compensated comparison value CCV may represent the grayscale difference. Accordingly, position and size of the defect DF in the inspection target pattern PN5 may be detected from or based on the compensated comparison value CCV.

Figure 13:
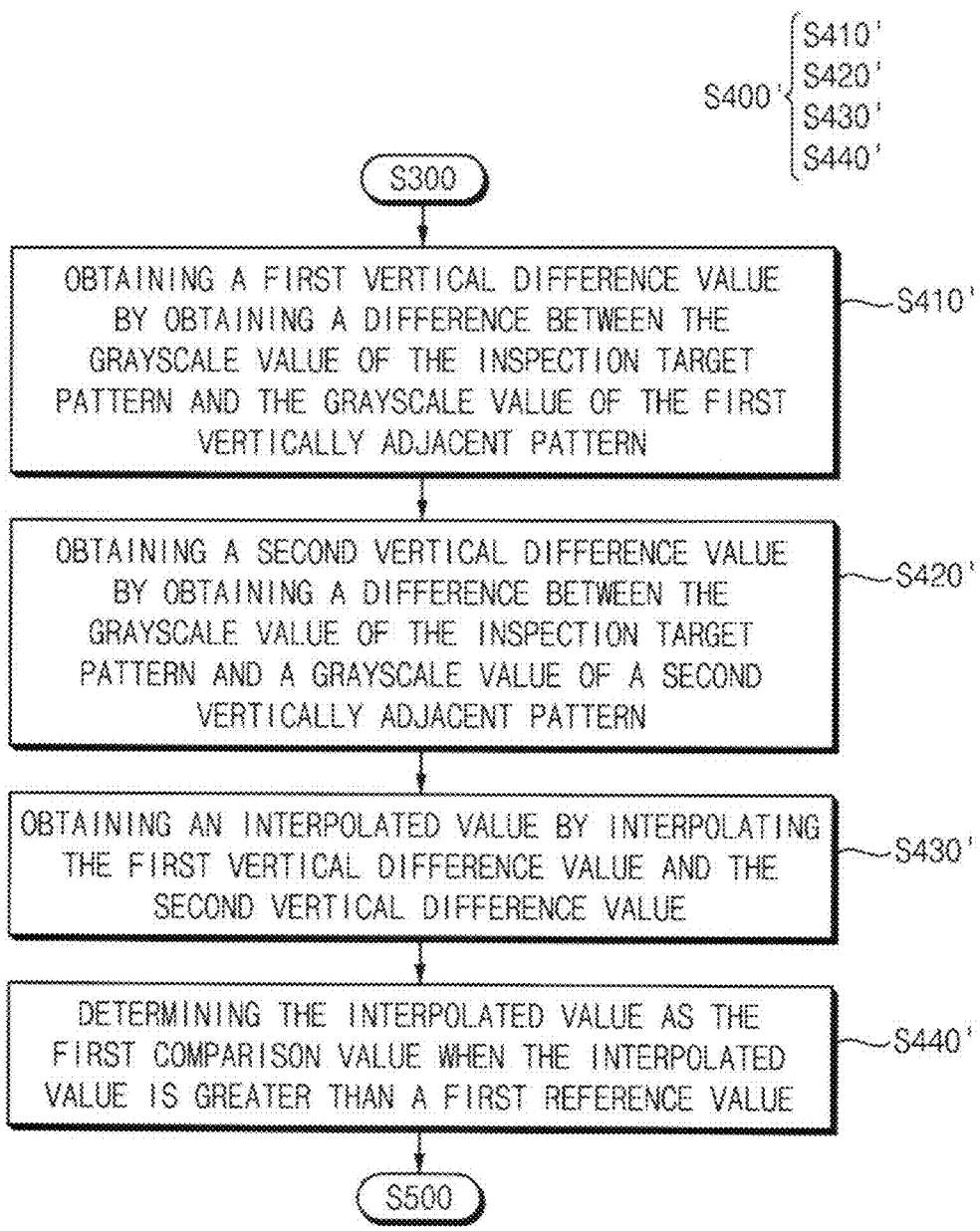

FIG. 13, FIG. 14, and FIG. 15 are diagrams illustrating the obtaining the first comparison value (S400') according to an embodiment.

Referring to FIG. 13, FIG. 14, and FIG. 15, in an embodiment, the obtaining the first comparison value CV1' (S400') may include obtaining a first vertical difference value V_DV1 by obtaining a difference between the grayscale value GV_PN5 of the inspection target pattern PN5 and a grayscale value GV_PN8 of the first vertically adjacent pattern PN8 (S410'), obtaining a second vertical difference value V_DV2 by obtaining a difference between the grayscale value GV_PN5 of the inspection target pattern PN5 and a grayscale value of a second vertically adjacent pattern adjacent to the inspection target pattern PN5 in a direction opposite to the first direction D1 (S420'), obtaining an interpolated value ITV by interpolating the first vertical difference value V_DV1 and the second vertical difference value V_DV2 (S430'), and determining the interpolated value ITV as the first comparison value CV1' when interpolated value ITV is greater than the first reference value RV1 (S440').

In such an embodiment, the obtaining the first vertical difference value V_DV1 may be substantially the same as obtaining the first vertical difference value DV1 described with reference FIG. 4, FIG. 5, and FIG. 6.

In such an embodiment, the obtaining the second vertical difference value V_DV2 may be substantially the same as the obtaining the first vertical difference value DV1 described with reference FIG. 4, FIG. 5, and FIG. 6 except that the inspection target pattern PN5 and the second vertically adjacent pattern PN2 are compared.

In the obtaining the interpolated value ITV, the interpolated value ITV may be a value between the first vertical difference value V_DV1 and the second vertical difference value V_DV2. In an embodiment, as show in FIG. 14 and FIG. 15, the interpolated value ITV may be an average of the first vertical difference value V_DV1 and the second vertical difference value V_DV2.

The first comparison value CV1' may be a value obtained by extracting a value greater than the first reference value RV1 from the interpolated value ITV. The first reference value RV1 may be an arbitrary set value. In an embodiment, for example, as shown in FIG. 15, the first reference value RV1 may be set to 15. In such an embodiment, values having a value greater than 15 among values included in the interpolated value ITV may be extracted and may be defined as first comparison value CV1'.

Figure 16:
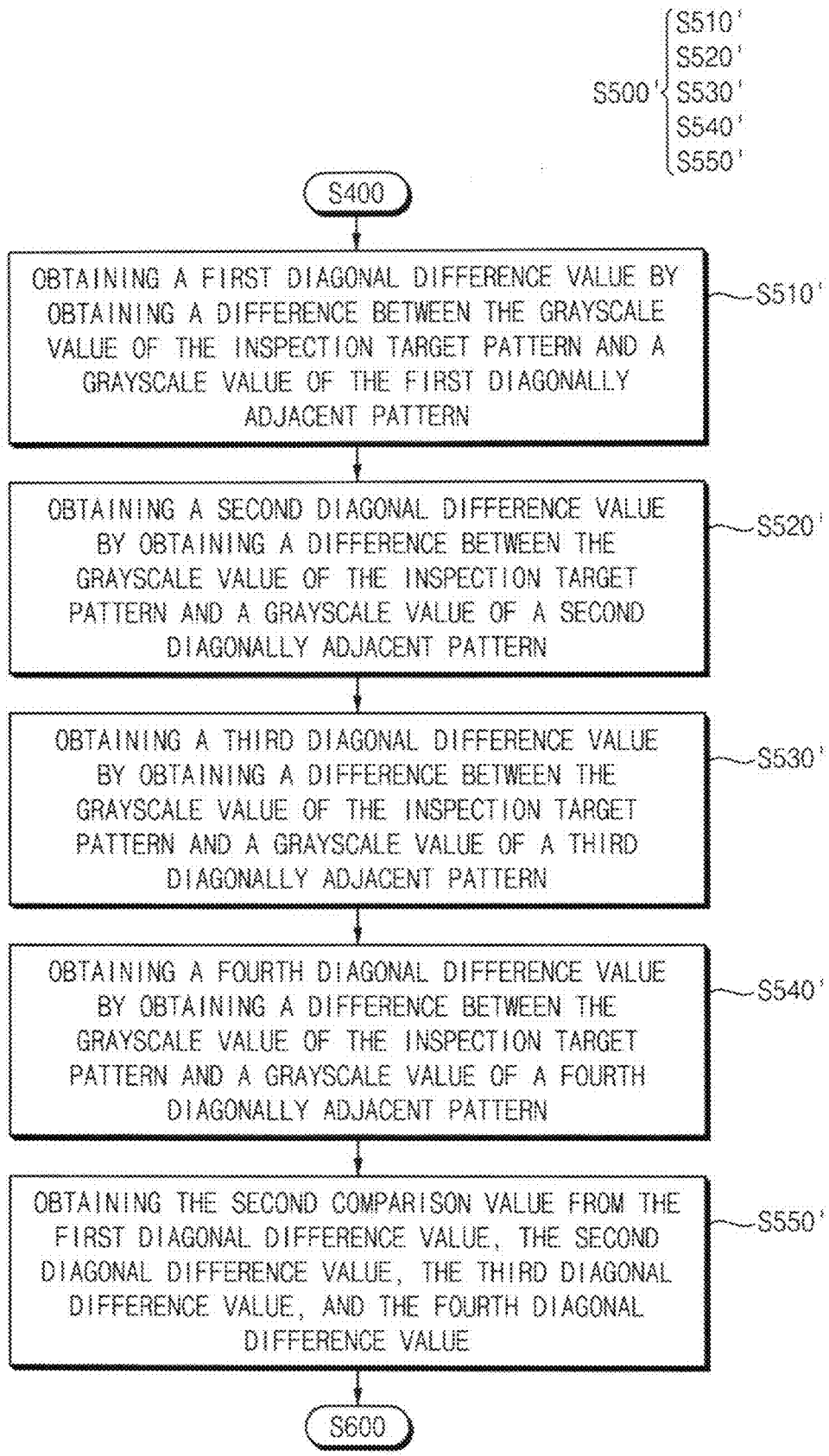

FIG. 16 is a diagram illustrating the obtaining the second comparison value (S500') according to an embodiment.

Referring to FIG. 2 and FIG. 16, in an embodiment, the obtaining the second comparison value (S500') may include obtaining a first diagonal difference value by obtaining a difference between the grayscale value of the inspection target pattern PN5 and the grayscale value of the first diagonally adjacent pattern PN9 (S510'), obtaining a second diagonal difference value by obtaining a difference between the grayscale value of the inspection target pattern PN5 and a grayscale value of the second diagonally adjacent pattern PN1 adjacent to the inspection target pattern PN5 in a direction opposite to the third direction D3 (S520'), obtaining a third diagonal difference value by obtaining a difference between the grayscale value of the inspection target pattern PN5 and a grayscale value of the third diagonally adjacent pattern PN7 adjacent to the inspection target pattern PN5 in a fourth direction D4 crossing the first direction D1 and the second direction D2 (S530'), obtaining a fourth diagonal difference value by obtaining a difference between the grayscale value of the inspection target pattern PN5 and a grayscale value of the fourth diagonally adjacent pattern PN3 adjacent to the inspection target pattern PN5 in a direction opposite to the fourth direction D4 (S540'), and obtaining the second comparison value from the first diagonal difference value, the second diagonal difference value, the third diagonal difference value, and the fourth diagonal difference value.

In such an embodiment, the obtaining the first diagonal difference value (S510') may be substantially the same as the obtaining the first diagonal difference value DV2 (S510) described with reference to FIG. 4, FIG. 5, and FIG. 6.

In such an embodiment, the obtaining the second diagonal difference value (S520') may be substantially the same as the obtaining the first diagonal difference value DV2 (S510) described with reference to FIG. 4, FIG. 5, and FIG. 6 except that the inspection target pattern PN5 and the second diagonally adjacent pattern PN1 are compared.

In such an embodiment, the obtaining the third diagonal difference value (S530') may be substantially the same as the obtaining the first diagonal difference value DV2 (S510) described with reference to FIG. 4, FIG. 5, and FIG. 6 except that the inspection target pattern PN5 and the third diagonally adjacent pattern PN7 are compared.

In such an embodiment, the obtaining the fourth diagonal difference value (S540') may be substantially the same as obtaining the first diagonal difference value DV2 (S510) described with reference to FIG. 4, FIG. 5, and FIG. 6 except that the inspection target pattern PN5 and the fourth diagonally adjacent pattern PN3 are compared.

In such an embodiment, the obtaining the second comparison value (S550') may include obtaining an interpolated value by interpolating the first diagonal difference value, the second diagonal difference value, the third diagonal difference value, and the fourth diagonal difference value, and determining the interpolated value as the second comparison value when the interpolated value is greater than the second reference value.

Figure 17:
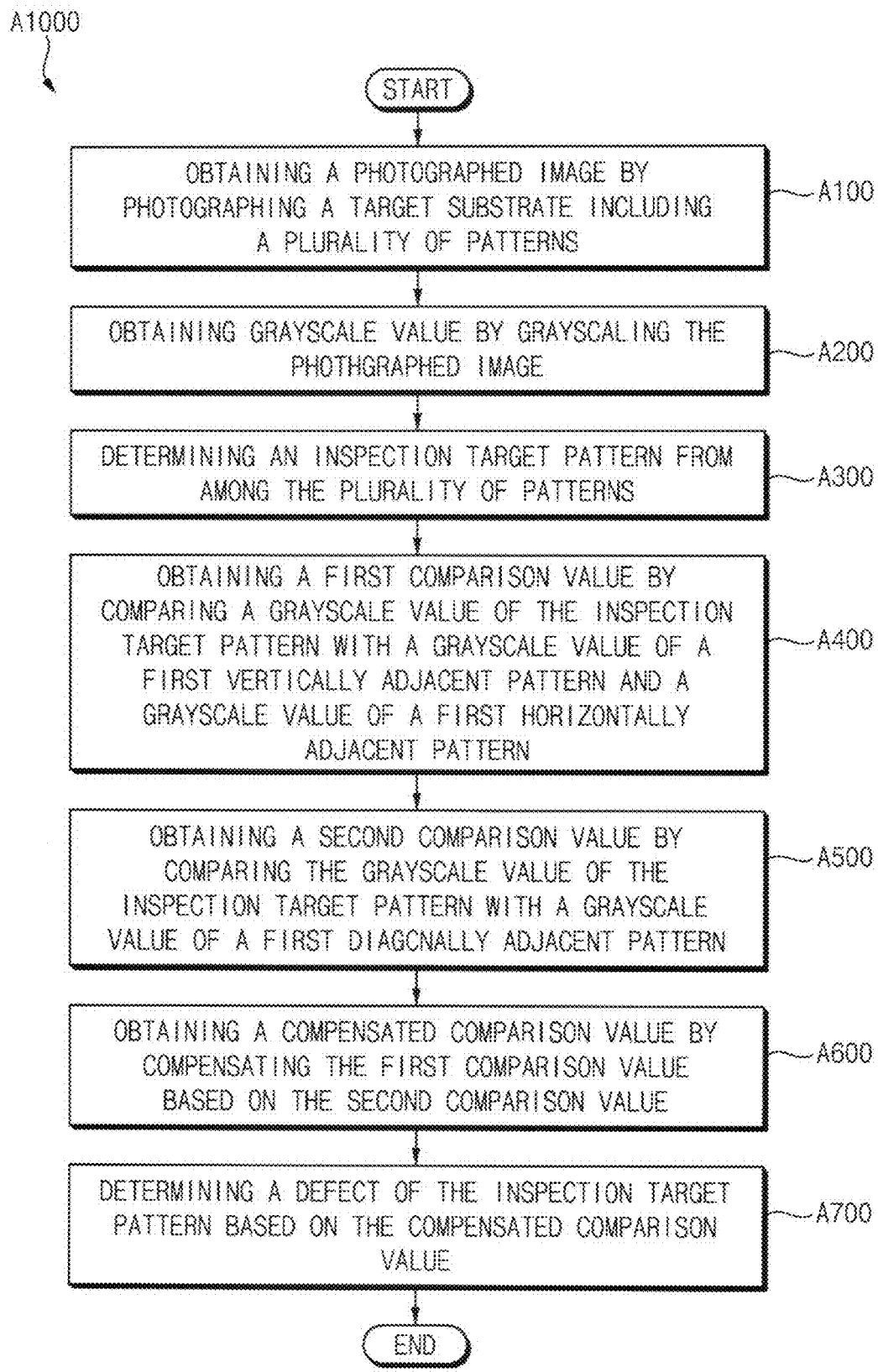
FIG. 17 and FIG. 18 are diagrams illustrating a method of testing a display device according to an alternative embodiment.

FIG. 17 is diagram illustrating a method of testing a display device according to an alternative embodiment.

Referring to FIG. 17, in an alternative embodiment of a method of testing a display device A1000 may include obtaining a photographed image by photographing a target substrate 130 including a plurality of patterns PN (A100), obtaining grayscale values of the plurality of patterns PN by grayscaling the photographed image (A200), determining an inspection target pattern among the plurality of patterns PN (A300), obtaining a first comparison value by comparing a grayscale value of the inspection target pattern with a grayscale value of a first vertically adjacent pattern and a grayscale value of a first horizontally adjacent pattern (A400), obtaining a second comparison value by comparing the grayscale value of the inspection target pattern with a grayscale value of a first diagonally adjacent pattern (A500), obtaining a compensated comparison value by compensating the first comparison value based on the second comparison value (A600), and determining a defect of the inspection target pattern based on the compensated comparison value (A700).

In such an embodiment, the obtaining the photographed image (A100) may include photographing the target substrate 130 with the camera 120 and storing the photographed image.

In such an embodiment, the obtaining the grayscale value (A200) may include generating the grayscale value by identifying a grayscale of the photographed image. In an embodiment, the grayscale value may have a value of 0 to 255.

In the determining the inspection target pattern (A300), any one of the first to ninth patterns PN1, PN2, PN3, PN4, PN5, PN6, PN7, PN8, and PN9 may be set as the inspection target pattern. Hereinafter, for convenience of description, an embodiment in which the fifth pattern PN5 is the inspection target pattern will be described.

In such an embodiment, the eight pattern PN8 adjacent to the inspection target pattern PN5 in the first direction D1 may be referred to as the first vertically adjacent pattern. The sixth pattern PN6 adjacent to the inspection target pattern PN5 in a second direction D2 may be referred to as the horizontally adjacent pattern. The ninth pattern PN9 adjacent to the inspection target pattern PN5 in a third direction D3 crossing the first direction D1 and the second direction D2 may be referred to as the diagonally adjacent pattern. In such an embodiment, an angle formed by the first direction D1 and the second direction D3 may be greater than about 0° and less than about 90°. In an embodiment, for example, the angle formed by the first direction D1 and the third direction D3 may be greater than about 35° and smaller than about 55°.

In such an embodiment, the obtaining the second comparison value (A500), obtaining the compensated comparison value (A600), and the determining the defect of the inspection target pattern (A700) may be substantially the same as the obtaining the second comparison value (S500), the obtaining the compensated comparison value (S600), and the determining the defect of the inspection target pattern (S700) described with reference to FIG. 1 to FIG. 16.

Figure 18:
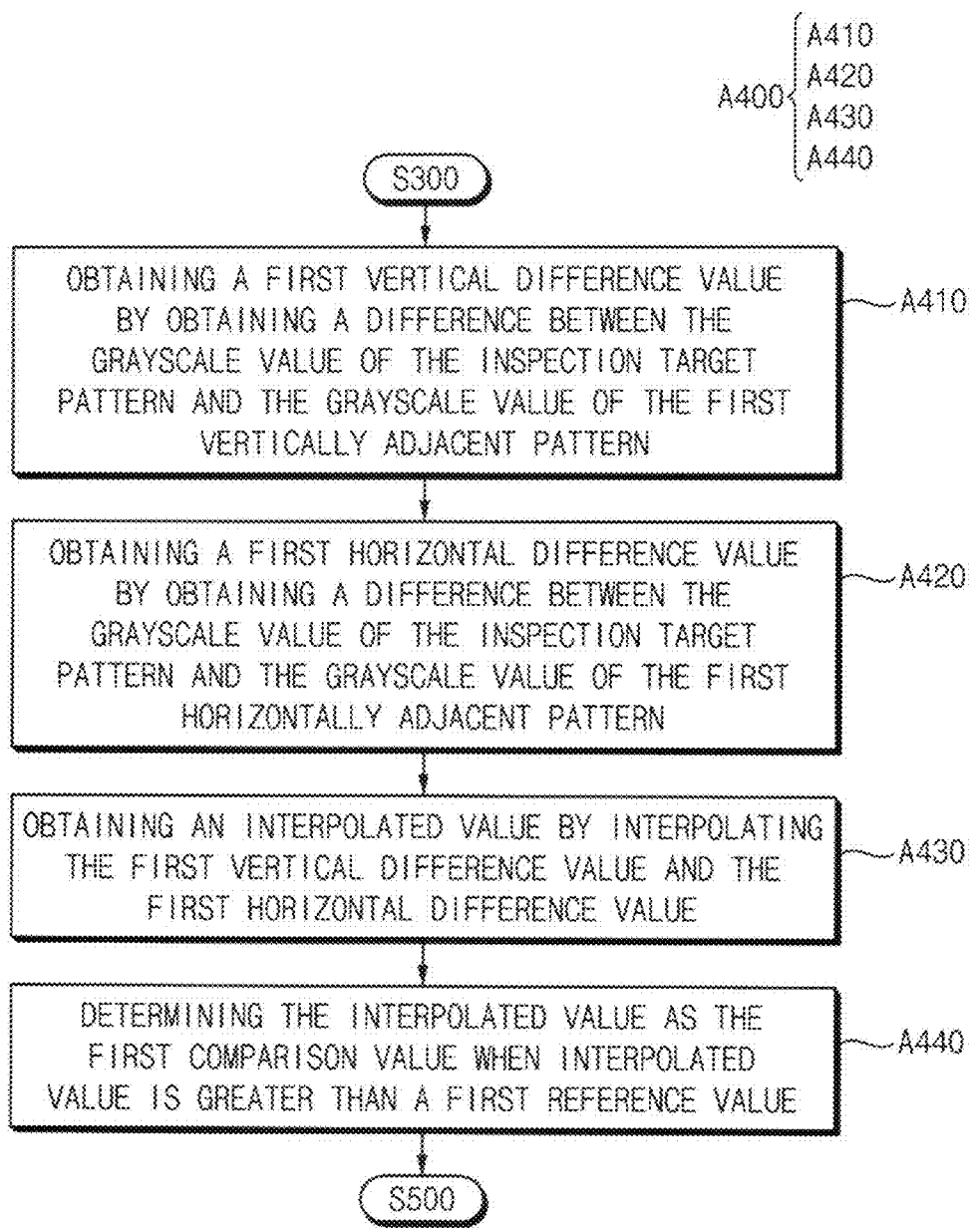

FIG. 18 is a diagram illustrating obtaining the first comparison value (A400).

Referring to FIG. 18, the obtaining the first comparison value (A400) may include obtaining a first vertical difference value by obtaining a difference between the grayscale value of the inspection target pattern PN5 and the grayscale value of the first vertically adjacent pattern PN8 (A410), obtaining a first horizontal difference value by obtaining a difference between the grayscale value of the inspection target pattern PN5 and the grayscale value of the first horizontally adjacent pattern PN6 (A420), obtaining an interpolated value by interpolating the first vertical difference value and the first horizontal difference value (A430), and determining the interpolation value as the first comparison value when interpolated value is greater than a second reference value (A440).

In an embodiment, the interpolated value may be a value between the first vertical difference value and the first horizontal difference value. In an embodiment, for example, the interpolated value may be an average of the first vertical difference value and the first horizontal difference value.

In an embodiment, the obtaining the first comparison value (A400) may further include obtaining a second vertical difference value by obtaining a difference between the grayscale value of the inspection target pattern PN5 and a grayscale value of a second vertically adjacent pattern PN2 adjacent to the inspection target pattern PN5 in a direction opposite to the first direction D1. In such an embodiment, the obtaining the interpolated value (A430) may include obtaining the interpolated value by interpolating the first vertical difference value, the second vertical difference value, and the first horizontal difference value.

In an embodiment, the obtaining the first comparison value (A400) may further include obtaining a second horizontal difference value by obtaining a difference between the grayscale value of the inspection target pattern PN5 and a grayscale value of a second horizontally adjacent pattern PN4 adjacent to the inspection target pattern PN5 in a direction opposite to the second direction D2. In such an embodiment, obtaining the interpolated value (A430) may include obtaining the interpolated value by interpolating the first vertical difference value, the first horizontal difference value, and the second horizontal difference value.

According to embodiments of the invention, a method of testing a display device may include obtaining a first comparison value by comparing a gradation value of an inspection target pattern and a gradation value of a first vertically adjacent pattern, obtaining a second comparison value by comparing the gradation value of an inspection target pattern and a gradation value of a first diagonally adjacent pattern, and obtaining a compensated comparison value by compensating the first comparison value based on the second comparison value. Accordingly, defect detection accuracy may be improved.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:
1. A method of testing a display device, the method comprising:
obtaining a photographed image by photographing a target substrate, wherein the target substrate comprises a plurality of patterns arranged in a first direction and a second direction perpendicular to the first direction;
obtaining grayscale values of the plurality of patterns by grayscaling the photographed image;
determining an inspection target pattern from among the plurality of patterns;
obtaining a first comparison value by comparing a grayscale value of the inspection target pattern with a grayscale value of a first vertically adjacent pattern adjacent to the inspection target pattern in the first direction;
obtaining a second comparison value by comparing the grayscale value of the inspection target pattern with a grayscale value of a first diagonally adjacent pattern adjacent to the inspection target pattern in a third direction crossing the first direction and the second direction;
obtaining a compensated comparison value by compensating the first comparison value based on the second comparison value; and
determining a defect of the inspection target pattern based on the compensated comparison value.

2. The method of claim 1, wherein the obtaining the first comparison value comprises:
  obtaining a first vertical difference value by obtaining a difference between the grayscale value of the inspection target pattern and the grayscale value of the first vertically adjacent pattern; and
  determining the first vertical difference value as the first comparison value when the first vertical difference value is greater than a first reference value.

3. The method of claim 2, wherein the obtaining the second comparison value comprises:
  obtaining a first diagonal difference value by obtaining a difference between the grayscale value of the inspection target pattern and the grayscale value of the first diagonally adjacent pattern; and
  determining the first diagonal difference value as the second comparison value when the first diagonal difference value is greater than a second reference value.

4. The method of claim 3, wherein the first reference value and the second reference value are different from each other.

5. The method of claim 4, wherein the first reference value is greater than the second reference value.

6. The method of claim 1, wherein an angle between the first direction and the third direction is greater than 0° and smaller than 90°.

7. The method of claim 1, wherein the obtaining the compensated comparison value comprises:
  obtaining a comparison difference value by obtaining a difference between the first comparison value and the second comparison value; and
  determining the first comparison value as the compensated comparison value when the comparison difference value is equal to or less than a third reference value.

8. The method of claim 1, wherein the obtaining the first comparison value further comprises:
  comparing the grayscale value of the inspection target pattern with a grayscale value of a second vertically adjacent pattern adjacent to the inspection target pattern in a direction opposite to the first direction.

9. The method of claim 8, wherein the obtaining the first comparison value further comprises:
  obtaining a first vertical difference value by obtaining a difference between the grayscale value of the inspection target pattern and the grayscale value of the first vertically adjacent pattern;
  obtaining a second vertical difference value by obtaining a difference between the grayscale value of the inspection target pattern and the grayscale value of the second vertically adjacent pattern;
  obtaining an interpolated value by interpolating the first vertical difference value and the second vertical difference value; and
  determining the interpolated value as the first comparison value when the interpolated value is greater than a first reference value.

10. The method of claim 9, wherein the interpolated value is an average of the first vertical difference value and the second vertical difference value.

11. The method of claim 1, wherein the obtaining the second comparison value further comprises:
  comparing the grayscale value of the inspection target pattern with a grayscale value of a second diagonally adjacent pattern adjacent to the inspection target pattern in a direction opposite to the third direction.

12. The method of claim 1, wherein obtaining the second comparison value further comprises:
  comparing the grayscale value of the inspection target pattern with a grayscale value of a third diagonally adjacent pattern adjacent to the inspection target pattern in a fourth direction crossing the first direction and the second direction.

13. The method of claim 12, wherein the obtaining the second comparison value further comprises:
  comparing the grayscale value of the inspection target pattern with a grayscale value of a fourth diagonally adjacent pattern adjacent to the inspection target pattern in a direction opposite to the fourth direction.

14. A method of testing a display device, the method comprising:
  obtaining a photographed image by photographing a target substrate, wherein the target substrate comprises a plurality of patterns arranged in a first direction and a second direction perpendicular to the first direction;
  obtaining grayscale values of the plurality of patterns by grayscaling the photographed image;
  determining an inspection target pattern from among the plurality of patterns;
  obtaining a first comparison value by comparing a grayscale value of the inspection target pattern with a grayscale value of a first vertically adjacent pattern adjacent to the inspection target pattern in the first direction and a grayscale value of a first horizontally adjacent pattern adjacent to the inspection target pattern in the second direction;
  obtaining a second comparison value by comparing the grayscale value of the inspection target pattern with a grayscale value of a first diagonally adjacent pattern adjacent to the inspection target pattern in a third direction crossing the first direction and the second direction;
  obtaining a compensated comparison value by compensating the first comparison value based on the second comparison value; and
  determining a defect of the inspection target pattern based on the compensated comparison value.

15. The method of claim 14, wherein the obtaining the first comparison value comprises:
  obtaining a first vertical difference value by obtaining a difference between the grayscale value of the inspection target pattern and the grayscale value of the first vertically adjacent pattern;
  obtaining a first horizontal difference value by obtaining a difference between the grayscale value of the inspection target pattern and the grayscale value of the first horizontally adjacent pattern;
  obtaining an interpolated value by interpolating the first vertical difference value and the first horizontal difference value; and
  determining the interpolated value as the first comparison value when interpolated value is greater than a first reference value.

16. The method of claim 15, wherein the interpolated value is an average of the first vertical difference value and the first horizontal difference value.

17. The method of claim 15, wherein the obtaining the second comparison value comprises:
  obtaining a first diagonal difference value by obtaining a difference between the grayscale value of the inspection target pattern and the grayscale value of the first diagonally adjacent pattern; and
  determining the first diagonal difference value as the second comparison value when the first diagonal difference value is greater than a second reference value.

18. The method of claim 17, wherein the first reference value and the second reference value are different from each other.

19. The method of claim 14, wherein an angle between the first direction and the third direction is greater than 0° and smaller than 90°.

20. The method of claim 14, wherein the obtaining the compensated comparison value comprises:
   obtaining a comparison difference value by obtaining a difference between the first comparison value and the second comparison value; and
   determining the first comparison value as the compensated comparison value when the comparison difference value is equal to or less than a third reference value.

* * * * *